United States Patent
Temming et al.

(10) Patent No.: US 7,428,961 B2
(45) Date of Patent: Sep. 30, 2008

(54) CONVEYOR DEVICE

(75) Inventors: Leonardus Johannes Temming, Aalten (NL); Geert Jan Menkhorst, Aalten (NL)

(73) Assignee: Staalkat International B.V., Aalsten (NL)

( * ) Notice: Subject to any disclaimer, the term of this patent is extended or adjusted under 35 U.S.C. 154(b) by 193 days.

(21) Appl. No.: 10/571,665

(22) PCT Filed: Sep. 13, 2004

(86) PCT No.: PCT/NL2004/000630

§ 371 (c)(1),
(2), (4) Date: Mar. 10, 2006

(87) PCT Pub. No.: WO2005/026022

PCT Pub. Date: Mar. 24, 2005

(65) Prior Publication Data
US 2007/0131521 A1    Jun. 14, 2007

(30) Foreign Application Priority Data
Sep. 15, 2003 (NL) .................................. 1024299

(51) Int. Cl.
*B65G 19/00* (2006.01)
(52) U.S. Cl. .................. 198/723; 198/608; 198/699.1
(58) Field of Classification Search ............... 198/723, 198/608, 699.1
See application file for complete search history.

(56) References Cited

U.S. PATENT DOCUMENTS

| | | | |
|---|---|---|---|
| 3,127,172 A | 3/1964 | Troiano et al. | |
| 3,272,309 A | 9/1966 | Reading | |
| 3,613,868 A | 10/1971 | Rickerd et al. | |
| 3,953,960 A | 5/1976 | Craven | |
| 4,036,355 A * | 7/1977 | Valli | 198/607 |
| 4,273,649 A | 6/1981 | Leverett | |
| 4,597,491 A * | 7/1986 | Conklin | 198/642 |
| 4,836,355 A * | 6/1989 | Blanc | 198/418.6 |
| 5,167,317 A * | 12/1992 | van der Schoot et al. | 198/469.1 |
| 6,109,421 A * | 8/2000 | Ross et al. | 198/457.07 |

FOREIGN PATENT DOCUMENTS

GB    297230    9/1928

* cited by examiner

*Primary Examiner*—Mark A Deuble
(74) *Attorney, Agent, or Firm*—Hoffmann & Barron, LLP

(57) ABSTRACT

A conveyor device (1) for conveying substantially round products (11), for example eggs, comprises a support track (4) along which the products (11) can move in a conveying direction during use. Furthermore, the conveyor device (1) comprises a first substantially cylindrical engagement member (5), which extends transversely over the support track (4) with respect to the conveying direction. The engagement member (5) is designed to be flexible at least at the circumference, in order to engage on the products (11) on the support track (4), and can rotate about its axial axis (6) in order to advance the products (11) along the support track (4). The support track (4), downstream of the first engagement member (5) as seen in the conveying direction, has a elevated portion (8) which is located at a distance from the first engagement member (5) which is such that the latter engages on the products (11) on the upward part of the elevated portion (8).

28 Claims, 4 Drawing Sheets

CONVEYOR DEVICE

CROSS-REFERENCE TO RELATED APPLICATIONS

This application is the National Stage of International Application No. PCT/NL2004/000630, filed Sep. 13, 2004, which claims the benefit of Netherlands Application No. NL 1024299, filed Sep. 15, 2003, the contents of all of which are incorporated by reference herein.

FIELD OF THE INVENTION

The invention relates to a conveyor device for conveying substantially round products, for example eggs. Such a conveyor device comprises a support track, along which the products can move in a conveying direction during use. Furthermore the conveyor device comprises a first, substantially cylindrical engagement member, which extends transversely over the support track with respect to the conveying direction. Said first cylindrical engagement member is designed to be flexible at least at its circumference, in order to engage on the products on the support track, and it can rotate about its axial axis in order to advance the products along the support track.

BACKGROUND OF THE INVENTION

A conveyor device of this type is known from EP 0 098 734. This known device for handling eggs has a curved, flexible support track, which runs substantially from the top downwards, and a rotatable, cylindrical brush arranged across the support track. Eggs are supplied in two rows by means of a conveyor with grippers and one by one are released above the support track or above the brush. The eggs roll downwards along the support track, and are advanced by the brush at the bottom part of the support track before being released to an adjoining conveyor at a certain velocity at the bottom end.

At the side on which they are released, the eggs may roll "head first" when the brush is no longer engaging on them. As a result, the egg is first of all decelerated in the conveying direction and then accelerated, producing a jolting movement pattern. On account of the fact that not every egg is released in the same way by the support track and brush, it is possible for one egg to be decelerated while the next egg is accelerated. As a result, the eggs collide with one another, which can cause the eggshell to break. This situation could also arise with other products, with a substantially round but not completely spherical shape, such as certain types of fruit, for example apples, peaches and the like, which may be undesirable with regard to bruising of the fruit.

It is an object of the invention to provide an improved conveyor device of the abovementioned type in which the movement of the products along the support track is better controlled.

SUMMARY OF THE INVENTION

According to a first aspect of the invention, this object is achieved by a conveyor device for conveying substantially round products, for example eggs, comprising a support track, along which the products can move in a conveying direction during use, and a first, substantially cylindrical engagement member, which extends transversely over the support track with respect to the conveying direction. Said engagement member is designed to be flexible at least at its circumference, in order to engage on the products on the support track, and can rotate about its axial axis in order to advance the products along the support track. Said support track, downstream of the first engagement member as seen in the conveying direction, has an elevated portion which is located at a distance from the first engagement member which is such that the latter engages on the products on the upward part of the elevated portion.

This measure makes the distance of track along which the first engagement member engages on the product longer, with the result that the velocity of the product remains constant and controlled for a longer period of time.

In a particularly expedient preferred embodiment, downstream of the first engagement member, as seen in the conveying direction, there is arranged a second substantially cylindrical engagement member, which extends transversely across the support track with respect to the conveying direction and is designed to be flexible at least at the circumference, in order to engage on the products on the support track, and can rotate about its axial axis in order to advance the products along the support track, which second engagement member can rotate in the same direction as the first engagement member.

The second engagement member allows the product coming off the elevated portion to be collected and conveyed onwards.

In a further preferred embodiment, the second engagement member, as seen in the conveying direction, is located at a distance downstream of the elevated portion which is such that the second engagement member engages on the products on the downward section of the elevated portion. This has the advantage that the products are in contact with one of the two engagement members over the entire path, with the result that the velocity of the products is equal to that of one of the engagement members throughout, and therefore the products cannot come into contact with one another.

The invention also relates to a conveyor device for conveying substantially round products, for example eggs, comprising a support track, along which the products can move in a conveying direction during use, and a first, substantially cylindrical engagement member, which extends transversely over the support track with respect to the conveying direction. Said first engagement member is designed to be flexible at least at its circumference, in order to engage on the products on the support track, and can rotate about its axial axis in order to advance the products along the support track. The support track has a higher part, a transition piece, which adjoins the higher part downstream of the first engagement member, as seen in the conveying direction, and a lower part, which adjoins the transition piece. The first engagement member is arranged over the higher part of the support track, in the vicinity of the transition piece. A second substantially cylindrical engagement member is provided, which extends transversely over the support track with respect to the conveying direction. Said second engagement member is designed to be flexible at least at the circumference in order to engage on the products, and can rotate about its axial axis in order to advance the products along the support track. Said second engagement member is arranged substantially at the transition piece in order to engage on the products which, during use are situated on the transition piece and a part of the lower part of the support track.

The conveyor devices described above are based on the common insight that, to achieve maximum control of the velocity of the products, it is desirable for the engagement members to be active over the maximum possible length of the support track.

The first engagement member is preferably designed to have a higher circumferential velocity than the second engagement member during use. The result of this is that the products are decelerated, with the result that the row of products is closed up, which is expedient with regard to the use of space and the processing capacity of the device. This aspect may also be employed separately from the elevated portion and forms a second aspect of the invention.

It is preferable for the first and/or second engagement member to be designed as a brush with bristles for engaging on the products.

The invention will be explained in more detail in the following description with reference to the drawings.

DETAILED DESCRIPTION OF THE INVENTION

Figure 1:
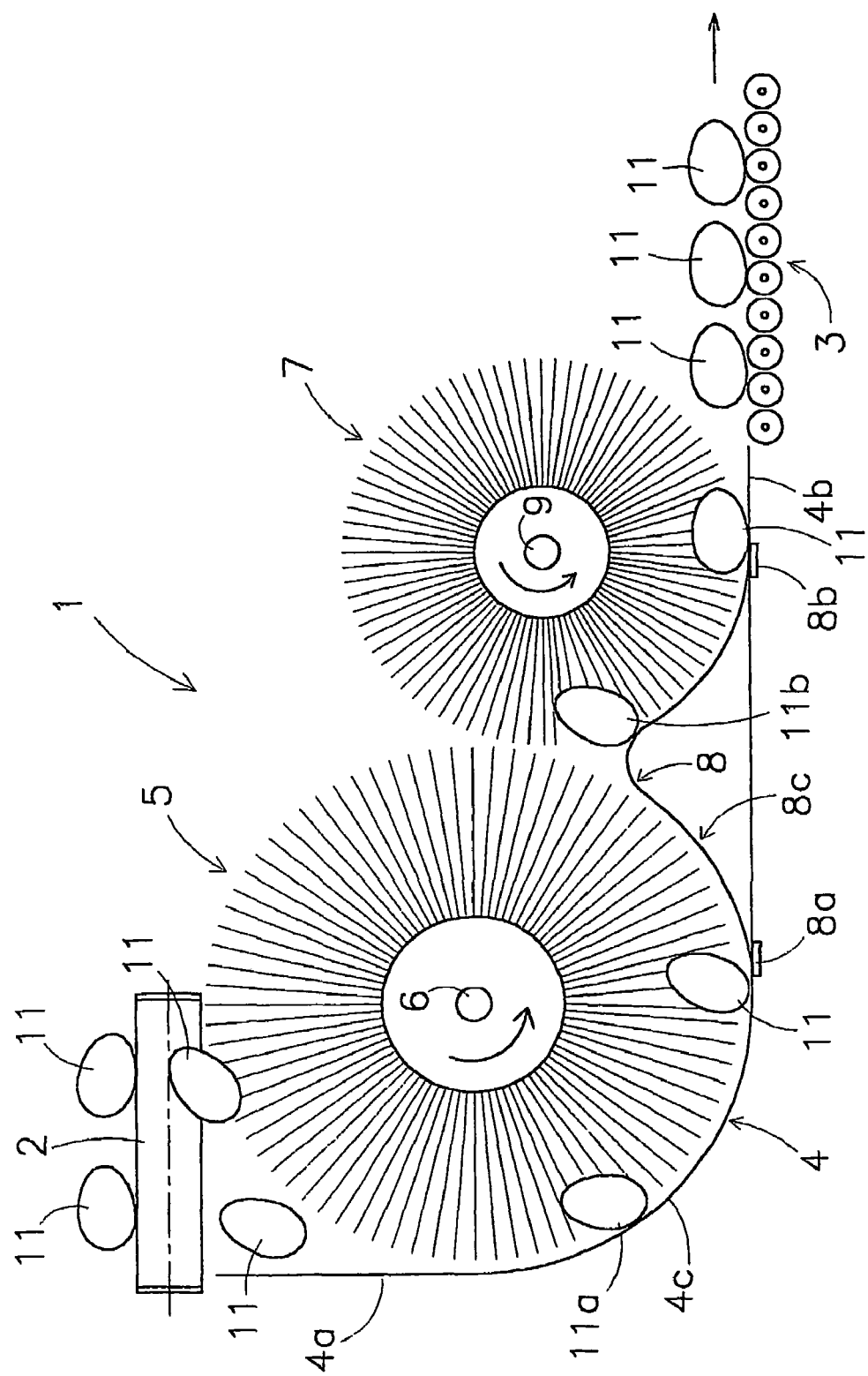
FIG. 1 shows a section of a sorting and packaging device having a preferred embodiment of a conveyor device in accordance with a first aspect of the invention.

In FIG. 1, reference numeral 1 denotes a preferred embodiment of the conveyor device. In the sorting and packaging device, the conveyor device 1 is positioned between a feed conveyor 2 and a discharge conveyor 3. In the example shown, feed conveyor 2 is located at a higher level than the discharge conveyor 3. The conveying direction of the feed conveyor 2 is in this example substantially perpendicular to the plane of the drawing and transverse with respect to the conveying direction of the discharge conveyor 3.

The conveying device 1 has a support track 4 which extends substantially from the feed conveyor 2 to the discharge conveyor 3. At the feed conveyor end 4a, the support track 4 extends substantially vertically downwards and then merges via a curved section 4c into a substantially horizontal section 4b which adjoins the discharge conveyor 3. This support track 4, may, for example, be made from a flexible plastic.

Furthermore, the conveyor device 1 comprises a first substantially cylindrical brush 5 which is fixed to a rotation shaft 6. The first brush 5 has substantially radially bristles which serve to engage on products, in this example eggs, which are located on the support track 4. Furthermore, the eggs are completely or partially held between the bristles, and the bristles are responsible for holding successive eggs at a distance from one another. The bristles therefore serve as a type of buffer.

A substantially cylindrical second brush 7 is arranged downstream of the first brush 5, as seen in the conveying direction. The second brush is fixed to a rotation shaft 9 and in this embodiment has a smaller diameter than the first brush 5. The second brush 7 has substantially radial bristles which have the same function as those of the first brush 5. The second brush 7, in operation, rotates in the same direction as the first brush 5.

It should be noted that within the scope of the invention it is also possible to use other engagement members instead of brushes, in which case the engagement member is designed to be flexible or elastic at the circumference, so that the eggs or other products are not damaged. This could be achieved, for example, by designing the engagement members as rollers made from a soft graded foam or another suitable material.

The support track 4 is provided with an elevated portion 8, which is located approximately at the level of an imaginary contact plane between the bristles of the first brush 2 and the second brush 7. The elevated portion is preferably produced from a strip of a flexible material, for example, a plastic, whose edges 8a and 8b are fixed to the support track 4. This fixing may be effected, for example, by the edges 8a and 8b being sewn securely to the support track 4. Fixing may also be effected by gluing, riveting or any other suitable fixing method. The edges 8a and 8b are positioned close together, such that the intervening part 8c of the strip is, as it were, folded and therefore bulges upwards with respect to the support track 4. The flexibility of the strip of material provides the elevated portion 8 with the ability to yield to a certain extent when an egg is being guided over it by the bristles 5 and 7. This yielding of the elevated portion 8 prevents an egg from becoming stuck and breaking between the brushes 5, 7, and the elevated portion 8. It is also possible for the strip to be arranged on the underside of the support track 4 if the latter is made from a flexible material. In that case, an upward bulge in the strip leads to an upward bulge in the track material. The support track 4 may also be made from a flexible material, and at the location of the elevated portion 8 may be secured to a base in such a manner that the material of the support track 4 bulges upwards. It is also possible for the elevated portion in the support track 4 to be formed in other ways.

In operation, eggs 11 are supplied by the feed conveyor 2. They may be supplied, for example, in two rows, as shown in the figure, although it is also possible for the eggs to be supplied randomly. The eggs lie at a certain distance from one another. At the end of the conveyor 2, the eggs 11 from the right-hand row (as seen in the drawing) of the conveyor, drop on to the first brush 5. The eggs 11 in the left-hand row drop on to the bristles and the support track 4, are guided further downwards with support from the support track 4 by the brush 5, as illustrated for the egg 11a.

The eggs 11 which have been engaged on by the first brush 5, are carried along by the bristles and as a result acquire a substantially constant velocity, which is determined by the rotational speed of the brush 5, along the support track 4. The eggs are guided along by the first brush 5 up to the highest point of the elevated portion 8. At the highest point of the elevated portion 8, the eggs 11 roll towards the downward side of the elevated portion 8, and immediately after the highest point are engaged on by the bristles of the second brush 7 as indicated for egg 11b. If the second brush 7 is rotating at the same rotational speed as the first brush 5, the eggs 11 are decelerated by the smaller diameter of the second brush 7. As a result, the eggs are moved to a shorter distance from one another, so that the row of eggs 11 is closed up. In an embodiment with brushes of identical dimensions or with brushes in which the first brush has a smaller diameter than the second brush (not shown), this closing-up effect can be achieved by virtue of the second brush rotating at a lower rotational speed than the first brush.

The eggs 11 are then released to the discharge conveyor 3 at a distance from one another and velocity determined by the size and rotational speed of the second brush 7.

Figure 2:
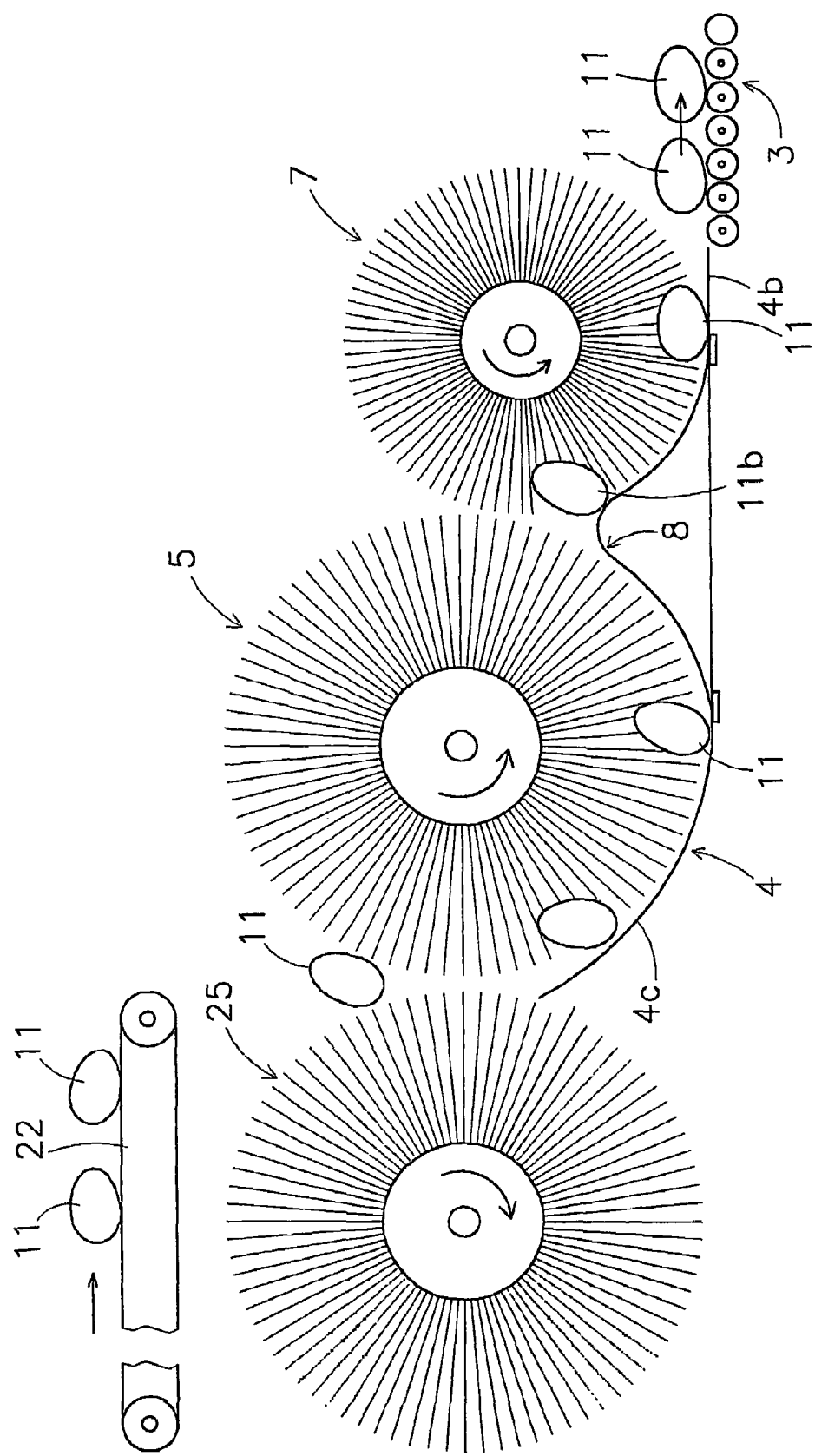
FIG. 2 shows another embodiment of a conveyor device in accordance with the first aspect of the invention.

FIG. 2 shows another conveyor device according to the invention.

In this embodiment, the eggs 11 are supplied by a conveyor belt 22. At the end 22a of the conveyor belt 22, the eggs drop downwards and are collected by the brushes 25 and 5, which are positioned next to one another and engage in one another. These brushes 25 and 5 rotate in opposite directions. The start of the support track 4 is positioned between the brushes 25 and 5, with the result that the eggs 11 are collected when they are carried downwards by the brushes 25 and 5. A design of this type, having two brushes rotating in opposite directions, is known per se from EP 0 098 734. The remainder of the conveyor device corresponds to the conveyor device shown in FIG. 1, and corresponding components are denoted by identical reference numerals.

Figure 3:
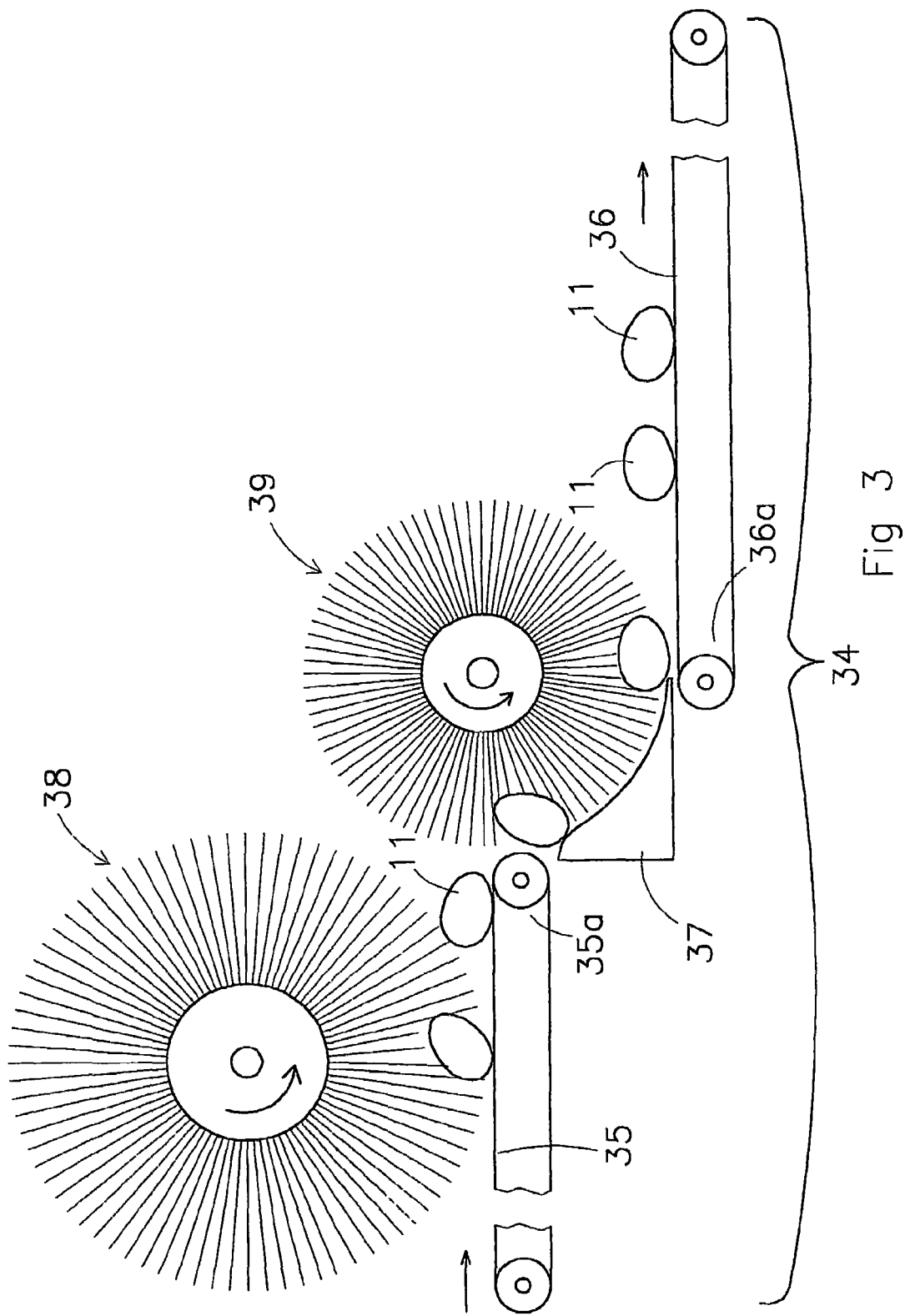
FIG. 3 shows an alternative embodiment of a conveyor device in accordance with the first aspect of the invention.

FIG. 3 shows a conveyor device having a support track 34 along which the products can be moved in a conveying direction during use. The support track 34 has a higher part 35 and a lower part 36. A transition piece 37 is arranged between the higher part 35 and the lower part 36. This transition piece 37 serves to support the eggs 11 at the transition from the higher level to the lower level. A first brush 38 is arranged transversely across the track at that end 35a of the higher part 35 of the support track 34 which adjoins the transition piece 37. A second brush 39 which, in use, rotates in the same direction as the first brush 38, is arranged at the transition piece 37. In this example, the first brush 38 has a larger diameter than the second brush 39. In use, eggs 11 or other products are supplied to the first brush 38. As a result of the first brush 38 engaging on the eggs, the eggs are conveyed through beneath the brush 38 and passed on to the second brush 39. This second brush 39 guides the eggs 11 along the transition piece 37 and an adjoining first section 36a of the lower part 36 of the support track 34.

The embodiment shown, comprising on the one hand the variants shown in FIGS. 1 and 2 and on the other hand the variant shown in FIG. 3 are based on the common idea of the space which is always present as a result of the roundness of the first brush 5, 38 and the second brush 7, 39, arranged downstream of it in the conveying direction, being partially filled, such that the products are engaged on by one of the brushes over the longest possible path, with the result that the movement of the products is as fully controlled as possible. In FIGS. 1 and 2, this space is partially filled by the elevated portion 8, while in FIG. 3 this space is filled by the end 35a of the higher part 35 of the support track 34 and by the transition piece 37.

Figure 4:
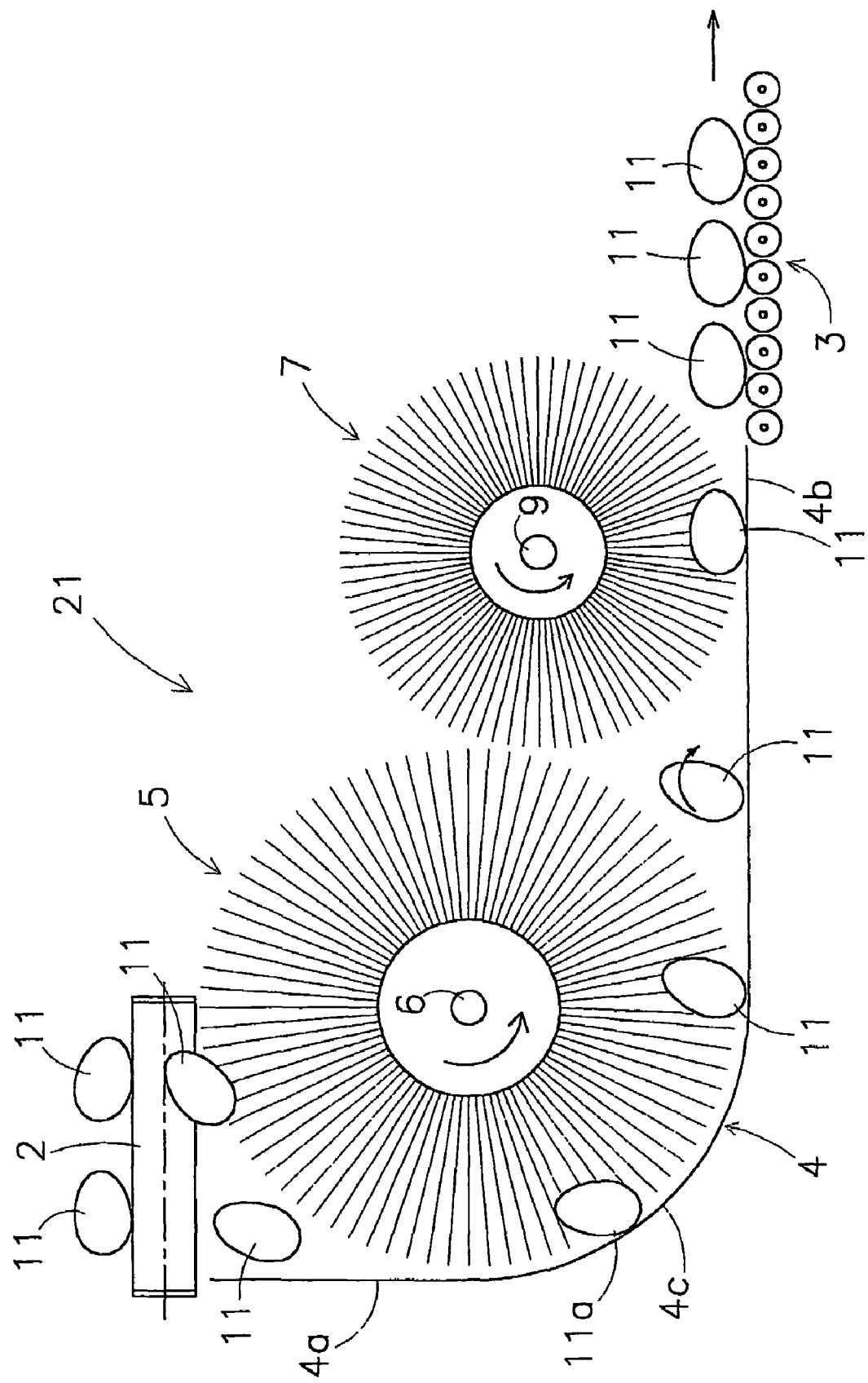
FIG. 4 shows a conveyor device in accordance with a second aspect of the invention.

FIG. 4 shows a conveyor device 21 in accordance with a second aspect of the invention. The only difference between this device and the device shown in FIG. 1 is that there is no elevated portion arranged between the first brush 5 and the second brush 7. The other components are denoted by identical reference numerals. A conveyor device 21 of this type can be used to transfer the eggs or other products, which are supplied in one or more rows or randomly to a discharge conveyor 3, with the eggs or other products being positioned on the discharge conveyor 3 at a shorter distance from one another.

In the embodiments shown in FIGS. 1, 2 and 4 the support track extends downwards from a higher part via a curve. The support track may also be flat and may even be completely horizontal, as shown in FIG. 3. The latter is appropriate, if the feed conveyor and the discharge conveyor are at the same level. However, it should be understood that the shape of the support track shown in the figures does not constitute any restriction on the concept of the invention.

Furthermore, the support track may be designed as a stationary trough along which the products roll or slide (cf. FIGS. 1, 2 and 4). However, within the scope of the invention it is also possible for the support track to be in part of movable design, for example as a conveyor belt for actively advancing the products (cf. FIG. 3).

What is claimed is:

1. Conveyor device for conveying substantially round products, comprising a support track, along which the products can move in a conveying direction during use, and a first, substantially cylindrical engagement member, which extends transversely over the support track with respect to the conveying direction and is designed to be flexible at least at its circumference, in order to engage on the products on the support track, and can rotate about its axial axis in order to advance the products along the support track, wherein the support track, downstream of the first engagement member as seen in the conveying direction, has an elevated portion which is located at a distance from the first engagement member which is such that the latter engages on the products on the upward part of the elevated portion, wherein downstream of the first engagement member, as seen in the conveying direction, there is arranged a second substantially cylindrical engagement member, which extends transversely across the support track with respect to the conveying direction and is designed to be flexible at least at the circumference, in order to engage on the products on the support track, and can rotate about its axial axis in order to advance the products along the support track, which second engagement member can rotate in the same direction as the first engagement member, and wherein the second engagement member, as seen in the conveying direction, is located at a distance downstream of the elevated portion which is such that the second engagement member engages on the products on the downward section of the elevated portion.

2. Conveyor device according to claim 1, in which the elevated portion is designed to be able to yield with the products.

3. Conveyor device according to claim 1, in which the elevated portion is formed from a strip of flexible material, of which a front end and a rear end are fixed at a distance from one another which is such that the material between them bulges upwards.

4. Conveyor device according to claim 1, in which the first engagement member is designed to have a greater circumferential velocity than the second engagement member during use.

5. Conveyor device according to claim 1, in which the first engagement member has a larger diameter than the second engagement member.

6. Conveyor device according to claim 1, in which the first engagement member, during use, can rotate at a higher speed than the second engagement member.

7. Conveyor device according to claim 1, in which the first engagement member is designed as a brush with bristles for engaging on the product.

8. Conveyor device according to claim 1, in which the second engagement member is designed as a brush with bristles for engaging on the product.

9. Conveyor device according to claim 1, in which the first engagement member and the second engagement member are designed as a brush with bristles for engaging on the product, which bristles of the first and second brushes partially engage in one another.

10. Conveyor device for conveying substantially round products, comprising a support track, along which the products can move in a conveying direction during use, and a first, substantially cylindrical engagement member, which extends transversely over the support track with respect to the conveying direction and is designed to be flexible at least at its circumference, in order to engage on the products on the support track, and can rotate about its axial axis in order to advance the products along the support track, wherein the support track has a higher part, a transition piece, which adjoins the higher part downstream of the first engagement member, as seen in the conveying direction, and a lower part, which adjoins the transition piece, the first engagement member being arranged over the higher part of the support track, in the vicinity of the transition piece, and a second substantially cylindrical engagement member being provided, which extends transversely over the support track with respect to the conveying direction and is designed to be flexible at least at the circumference in order to engage on the products, and can rotate about its axial axis in order to advance the products along the support track, which second engagement member is arranged substantially at the transition piece in order to engage on the products which, during use are situated on the transition piece and a part of the lower part of the support track, wherein the first engagement member and the second engagement member are designed as a brush with bristles for engaging on the product, which bristles of the first and second brushes partially engage in one another.

11. Conveyor device according to claim 10, in which the transition piece is designed to be able to yield with the products.

12. Conveyor device according to claim 10, in which the first engagement member is designed to have a greater circumferential velocity than the second engagement member during use.

13. Conveyor device according to claim 10, in which the first engagement member has a larger diameter than the second engagement member.

14. Conveyor device according to claim 10, in which the first engagement member, during use, can rotate at a higher speed than the second engagement member.

15. Conveyor device according to claim 10, in which the first engagement member is designed as a brush with bristles for engaging on the product.

16. Conveyor device according to claim 10, in which the second engagement member is designed as a brush with bristles for engaging on the product.

17. Conveyor device for conveying substantially round products, comprising a support track, along which the products can move in a conveying direction during use, and a first, substantially cylindrical engagement member, which extends transversely over the support track with respect to the conveying direction and is designed to be flexible at least at its circumference, in order to engage on the products on the support track, and can rotate about its axial axis in order to advance the products along the support track, wherein downstream of the first engagement member, as seen in the conveying direction, there is arranged a second substantially cylindrical engagement member, which extends transversely over the support track with respect to the conveying direction and is designed to be flexible at least in the circumference in order to engage on the products on the support track, and can rotate about its axial axis in order to advance the products along the support track, which second engagement member can rotate in the same direction as the first engagement member, the first engagement member being designed to have a higher circumferential velocity than the second engagement member during use, wherein the first engagement member and the second engagement member are designed as a brush with bristles for engaging on the product, which bristles of the first and second brushes partially engage in one another.

18. Conveyor device according to claim 17, in which the first engagement member is designed as a brush with bristles for engaging on the product.

19. Conveyor device according to claim 17, in which the second engagement member is designed as a brush with bristles for engaging on the product.

20. Sorting and packaging device for sorting and packaging substantially round products, comprising at least one conveyor device for conveying substantially round products, comprising a support track, along which the products can move in a conveying direction during use, and a first, substantially cylindrical engagement member, which extends transversely over the support track with respect to the conveying direction and is designed to be flexible at least at its circumference, in order to engage on the products on the support track, and can rotate about its axial axis in order to advance the products along the support track, wherein the support track, downstream of the first engagement member as seen in the conveying direction, has an elevated portion which is located at a distance from the first engagement member which is such that the latter engages on the products on the upward part of the elevated portion wherein which downstream of the first engagement member, as seen in the conveying direction, there is arranged a second substantially cylindrical engagement member, which extends transversely across the support track with respect to the conveying direction and is designed to be flexible at least at the circumference, in order to engage on the products on the support track, and can rotate about its axial axis in order to advance the products along the support track, which second engagement member can rotate in the same direction as the first engagement member, and wherein the second engagement member, as seen in the conveying direction, is located at a distance downstream of the elevated portion which is such that the second engagement member engages on the products on the downward section of the elevated portion.

21. Sorting and packaging device according to claim 20, comprising a first conveyor for supplying products with a distance between them and a second conveyor for removing products with a distance between them, wherein the conveyor device is placed between the first and the second conveyor to convey the products from the first to the second conveyor.

22. Sorting and packaging device according to claim 21, wherein the distance between the products on the first conveyor is greater than the distance between them on the second conveyor.

23. Sorting and packaging device for sorting and packaging substantially round products, comprising at least one conveyor device for conveying substantially round products, comprising a support track, along which the products can move in a conveying direction during use, and a first, substantially cylindrical engagement member, which extends transversely over the support track with respect to the conveying direction and is designed to be flexible at least at its circumference, in order to engage on the products on the support track, and can rotate about its axial axis in order to advance the products along the support track, wherein the support track has a higher part, a transition piece, which adjoins the higher part downstream of the first engagement member, as seen in the conveying direction, and a lower part, which adjoins the transition piece, the first engagement member being arranged over the higher part of the support track, in the vicinity of the transition piece, and a second substantially cylindrical engagement member being provided, which extends transversely over the support track with respect to the conveying direction and is designed to be flexible at least at the circumference in order to engage on the products, and can rotate about its axial axis in order to advance the products along the support track, which second engagement member is arranged substantially at the transition piece in order to engage on the products which, during use are situated on the transition piece and a part of the lower part of the support track, wherein the first engagement member and the second engagement member are designed as a brush with bristles for engaging on the product, which bristles of the first and second brushes partially engage in one another.

24. Sorting and packaging device according to claim 23, comprising a first conveyor for supplying products with a distance between them and a second conveyor for removing products with a distance between them, wherein the conveyor device is placed between the first and the second conveyor to convey the products from the first to the second conveyor.

25. Sorting and packaging device according to claim 24, wherein the distance between the products on the first conveyor is greater than the distance between them on the second conveyor.

26. Sorting and packaging device for sorting and packaging substantially round products, comprising at least one conveyor device for conveying substantially round products, comprising a support track, along which the products can move in a conveying direction during use, and a first, substantially cylindrical engagement member, which extends transversely over the support track with respect to the conveying direction and is designed to be flexible at least at its circumference, in order to engage on the products on the support track, and can rotate about its axial axis in order to advance the products along the support track, wherein downstream of the first engagement member, as seen in the conveying direction, there is arranged a second substantially cylindrical engagement member, which extends transversely over the support track with respect to the conveying direction and is designed to be flexible at least in the circumference in order to engage on the products on the support track, and can rotate about its axial axis in order to advance the products along the support track, which second engagement member can rotate in the same direction as the first engagement member, the first engagement member being designed to have a higher circumferential velocity than the second engagement member during use, wherein the first engagement member and the second engagement member are designed as a brush with bristles for engaging on the product, which bristles of the first and second brushes partially engage in one another.

27. Sorting and packaging device according to claim 26, comprising a first conveyor for supplying products with a distance between them and a second conveyor for removing products with a distance between them, wherein the conveyor device is placed between the first and the second conveyor to convey the products from the first to the second conveyor.

28. Sorting and packaging device according to claim 27, wherein the distance between the products on the first conveyor is greater than the distance between them on the second conveyor.

* * * * *